(12) United States Patent
Sassone et al.

(10) Patent No.: US 9,367,468 B2
(45) Date of Patent: Jun. 14, 2016

(54) DATA CACHE WAY PREDICTION

(71) Applicant: QUALCOMM Incorporated, San Diego, CA (US)

(72) Inventors: Peter G. Sassone, Austin, TX (US); Suresh K. Venkumahanti, Austin, TX (US); Lucian Codrescu, Austin, TX (US)

(73) Assignee: Qualcomm Incorporated, San Diego, CA (US)

( * ) Notice: Subject to any disclaimer, the term of this patent is extended or adjusted under 35 U.S.C. 154(b) by 225 days.

(21) Appl. No.: 13/741,917

(22) Filed: Jan. 15, 2013

(65) Prior Publication Data
US 2014/0201449 A1 Jul. 17, 2014

(51) Int. Cl.
G06F 12/16 (2006.01)
G06F 12/08 (2016.01)
G06F 9/345 (2006.01)
G06F 9/38 (2006.01)

(52) U.S. Cl.
CPC .......... *G06F 12/0864* (2013.01); *G06F 9/3455* (2013.01); *G06F 9/3832* (2013.01); *G06F 2212/6082* (2013.01)

(58) Field of Classification Search
None
See application file for complete search history.

(56) References Cited

U.S. PATENT DOCUMENTS

| | | | |
|---|---|---|---|
| 5,752,069 A | 5/1998 | Roberts et al. | |
| 5,822,756 A | 10/1998 | Thome et al. | |
| 6,055,622 A * | 4/2000 | Spillinger | 712/207 |
| 6,314,504 B1 * | 11/2001 | Dent | 711/212 |
| 6,401,193 B1 | 6/2002 | Afsar et al. | |
| 7,917,702 B2 | 3/2011 | Morrow et al. | |
| 8,151,084 B2 * | 4/2012 | Caprioli et al. | 711/205 |
| 8,151,096 B2 | 4/2012 | Hum et al. | |
| 2002/0133672 A1 * | 9/2002 | Van De Waerdt et al. | 711/128 |
| 2004/0030838 A1 * | 2/2004 | van de Waerdt | 711/137 |
| 2005/0050277 A1 | 3/2005 | Shen et al. | |
| 2005/0050278 A1 | 3/2005 | Meier et al. | |
| 2006/0294510 A1 * | 12/2006 | Hank et al. | 717/151 |
| 2008/0046653 A1 | 2/2008 | Knoth et al. | |
| 2009/0070531 A1 | 3/2009 | Venkumahanti et al. | |
| 2009/0216993 A1 * | 8/2009 | Venkumahanti et al. | 711/206 |
| 2010/0049912 A1 * | 2/2010 | Mylavarapu | 711/108 |
| 2010/0049953 A1 | 2/2010 | Mylavarapu et al. | |
| 2012/0084497 A1 | 4/2012 | Subramaniam et al. | |
| 2012/0173821 A1 | 7/2012 | Levenstein et al. | |

FOREIGN PATENT DOCUMENTS

WO 02073415 A2 9/2002

OTHER PUBLICATIONS

International Search Report and Written Opinion for International Application No. PCT/US2014/011051, ISA/EPO, Date of Mailing May 8, 2014, 15 pages.

* cited by examiner

*Primary Examiner* — Duc Doan
(74) *Attorney, Agent, or Firm* — Toler Law Group, PC

(57) ABSTRACT

In a particular embodiment, a method includes identifying one or more way prediction characteristics of an instruction. The method also includes selectively reading, based on identification of the one or more way prediction characteristics, a table to identify an entry of the table associated with the instruction that identifies a way of a data cache. The method further includes making a prediction whether a next access of the data cache based on the instruction will access the way.

29 Claims, 6 Drawing Sheets

DATA CACHE WAY PREDICTION

I. FIELD OF THE DISCLOSURE

The present disclosure is generally directed, to a data cache memory system.

II. BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, wireless telephones can also include a digital still camera, a digital video camera, a digital recorder, and an audio file player. Also, such wireless telephones include a processor that can process executable instructions, including software applications, such as a web browser application, that can be used to access the Internet. As such, these wireless telephones can include significant computing capabilities.

Accessing a data cache of a processor consumes a significant amount power. The data cache conventionally includes a data array having multiple sets that each include a plurality of cache lines (e.g., storage locations). The data cache conventionally also includes a plurality of ways that each include a driver corresponding to at least one cache line (e.g., a cache block) of the data cache. In response to an instruction to access data stored in the data cache, all of the drivers are enabled (e.g., activated) to drive (via a plurality of data lines) the ways of a particular set of the data array to a multiplexer.

In parallel (e.g., concurrently) with all of the drivers being enabled, a tag lookup operation is performed, to identify a particular cache line within the data array. Based on a result of the tag lookup operation, data provided via a single driver (corresponding to a single cache line) is selected as an output. Driving all of the ways for a set and performing the tag lookup operation cause power to be expended, and result in a power inefficiency considering that data from only a single cache line is output based on the instruction.

Similar power consumption issues exist with respect to accessing an instruction cache of the processor. Accesses to the instruction cache are frequently predictable and prediction methods utilizing predictable sequences of instructions may be used to identify a particular way of the instruction cache to be driven. However, accessing the data cache is more complex and less predictable than accessing the instruction cache. Accordingly, prediction techniques used for instruction cache accesses may not be applicable for predicting data cache accesses. Additionally, if a prediction technique were applied to a data cache, a performance penalty (e.g., a delay in processing) and an energy penalty would result from each misprediction (e.g., making an incorrect prediction) of a way to be accessed.

III. SUMMARY

A way prediction technique for a data cache of a processor utilizes a prediction table (e.g., a way prediction table) to track (e.g., monitor) and predict a way (e.g., a way associated with one or more cache lines) of the data cache to be driven for an instruction. In a particular embodiment, the predicted way is based on a prior execution of the instruction (e.g., the same way driven as the prior execution of the instruction). For each instruction executed by the processor, control logic may monitor and track execution of each instruction to populate, maintain, and/or utilize the prediction table to identify the predicted way. For example, the control logic of the data cache may track, using the prediction table, execution of one or more instructions based on a program counter (PC) identifier that indicates (e.g., identifies) a particular instruction, a way that is accessed for the particular instruction, and a base register location of a register file modified by the particular instruction.

When an instruction that has one or more way predication characteristics (e.g., an addressing mode of the instruction, an instruction type of the instruction, an indication that the instruction is included in a loop, etc.) is executed, the control logic may read the prediction table to determine whether a predicted way may be identified. For example, a way prediction characteristic may be a characteristic (e.g., a mode, an instruction type, a position within a loop, etc.) or component (e.g., an op-code, an operand, a bit value, etc.) of the instruction that indicates that the instruction may have a predictable next address (e.g., a predictable access pattern that indicates that an effective address retrieved based on the next execution of the instruction will be available from a same cache line (e.g., via a same way)). The control logic may determine whether an entry exists in the prediction table that corresponds to the instruction. In a particular embodiment, the one or more way prediction characteristics may comprise a mode (e.g., an addressing mode), such as an auto-increment addressing mode or a base plus offset addressing mode. The predicted way may be the way previously accessed during a prior execution of the instruction, such as a prior execution of the instruction during a prior iteration of a loop.

When the prediction table indicates a predicted way for an instruction, the control logic may selectively enable (e.g., turn on) a driver corresponding to the predicted way and may selectively disable (e.g., turn off) one or more other drivers corresponding to ways other than the predicted way. The control logic may also selectively disable (e.g., using a switch) a tag lookup operation of a tag array when the prediction table indicates the predicted way for the instruction. By selectively disabling one or more drivers and/or selectively disabling the tag lookup operation, power savings are realized by the processor.

In a particular embodiment, a method includes identifying one or more way prediction characteristics of an instruction. The method also includes selectively reading, based on identification of the one or more way prediction characteristics, a table to identify an entry of the table associated with the instruction that identifies a way of a data cache. The method further includes making a prediction whether a next access of the data cache based on the instruction will access the way.

In another particular embodiment, a processor includes decode logic configured to identify one or more way prediction characteristics of an instruction. The processor also includes control logic coupled to the decode logic. The control logic is configured to selectively read, based on the one or more way prediction characteristics, a table to identify an entry of the table associated with the instruction that identifies a way of a data cache. The control logic is further configured to make a prediction whether a next access of the data cache based on the instruction will access the way.

In a further particular embodiment, an apparatus includes means for identifying one or more way prediction characteristics of an instruction. The apparatus also includes means for selectively reading, based on identification of the one or more way prediction characteristics, a table to identify an entry of the table associated with the instruction that identifies a way of a data cache. The apparatus further includes means for making a prediction whether a next access of the data cache based on the instruction will access the way.

In another particular embodiment, a non-transitory computer readable medium includes instructions that, when executed by a processor, cause the processor to identify one or more way prediction characteristics of an instruction. The non-transitory computer readable medium further includes instructions that cause the processor to selectively read, based on identification of the one or more way prediction characteristics, a table to identify an entry of the table associated with the instruction that identifies a way of a data cache. The non-transitory computer readable medium further includes instructions that cause the processor to make a prediction whether a next access of the data cache based on the instruction will access the way.

In another particular embodiment, a method includes identifying an increment value during a first execution of an instruction and identifying a way of a data cache accessed during the first execution based on the instruction. The method further includes adding the increment value to an address value associated with the instruction to determine a first incremented address value. The method also includes determining whether the first incremented address value is located in the way of the data cache. The method further includes populating an entry corresponding to the instruction in a table in response to determining that the first incremented address is located in the way of the data cache.

One particular advantage provided by disclosed embodiments is a way prediction technique that maintains a prediction table for one or more instructions (e.g., based on an instruction type, an instruction addressing mode, identification of an instruction being in a loop, or a combination thereof). The way prediction table may be utilized to selectively enable and/or disable one or more drivers based on a way prediction. By selectively enabling and/or disabling one or more drivers, power savings may be realized during a data access of the data cache. Additionally, by monitoring, tracking, and storing a register location associated with each entry in the way prediction table, potential mispredictions may be avoided that would result when an instruction, other than the instruction that corresponds to the entry, modifies data (e.g., contents) at the register location. Additional power benefits may be realized by selectively disabling the tag lookup operation after the entry (e.g., the way prediction) has been verified as valid.

Other aspects, advantages, and features of the present disclosure will become apparent after review of the application, including the following sections: Brief Description of the Drawings, Detailed Description, and the Claims.

IV. BRIEF DESCRIPTION OF THE DRAWINGS

V. DETAILED DESCRIPTION

Figure 1:
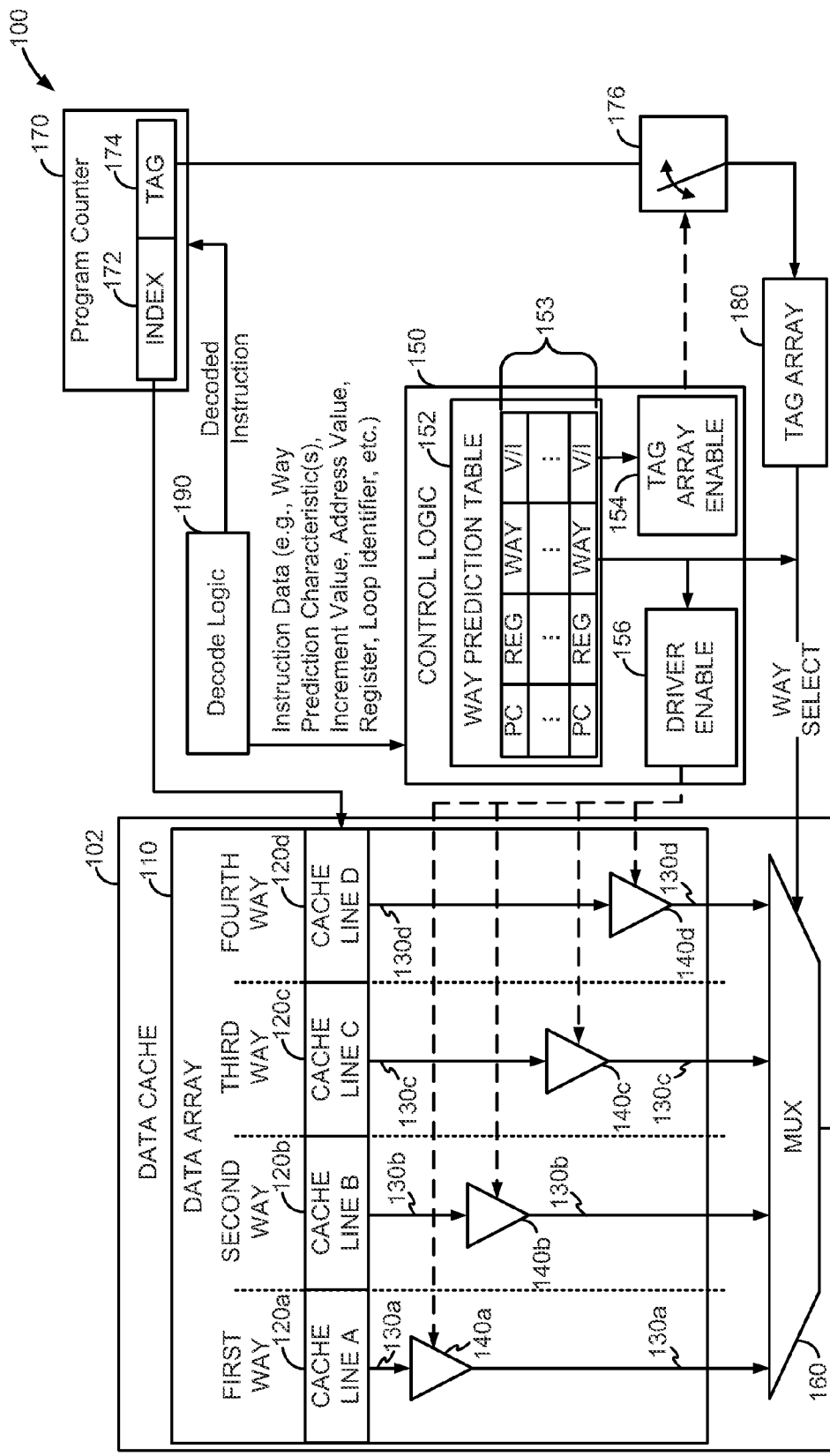
FIG. 1 is a diagram of a first illustrative embodiment of elements of a processor system that utilizes way prediction for a data cache.

FIG. 1 illustrates a first particular embodiment of elements of a processor system 100 that utilizes a way prediction table 152. The processor system 100 includes a data cache 102, control logic 150, a program counter 170, a tag array 180, and decode logic 190. The data cache 102 includes a data array 110 that includes a plurality of cache lines 120a-d. In a particular embodiment, the data cache 102 comprises a set-associative data cache.

The processor system 100 is configured to execute (e.g., process) instructions (e.g., a series of instruction) included in a program. The program may include a loop, or multiple loops, in which a series of instructions are executed one or more times. The program may include one or more instructions, such as instructions having one or more way predication characteristics (e.g., an addressing mode of the instruction, an instruction type of the instruction, an indication that the instruction is included, in a loop, etc.) that is an indication that the instruction may have a predictable next address (e.g., a predictable access pattern that indicates that an effective address for the next instruction to be executed, will be available from a same cache line (e.g., via a same way)). For example, the addressing mode of the instruction may include an auto increment addressing mode and/or a base plus offset addressing mode, which cause an operation of a cache line of a data array of a data cache (e.g., the data cache 102). An instruction using the auto increment addressing mode (e.g., an auto increment instruction) may identify a register location (e.g., a base register) of a register file (not shown) and may modify (e.g., increment) the contents (e.g., address data) stored at the register location by an increment amount (e.g., an integer value, such as 1 or 2). An instruction using the base plus offset addressing mode (e.g., a base plus offset instruction) may access a register location (e.g., a base register location) during each execution of the instruction and may add an offset to the data at the base register location with each successive execution of the instruction.

When the instructions using the auto increment addressing mode and/or the base plus offset addressing mode are executed as part of a loop (e.g., executed several times), the instructions may each include a predictable access pattern that indicates that an effective address retrieved, based on the next execution of the instruction will be available from a same cache line 120a-d (e.g., a same way) of the data array 110. Accordingly, during execution of the instructions (e.g., during one or more iterations of the loop), a particular way of the data cache 102 that is accessed for an instruction that uses the auto increment addressing mode or the base plus offset addressing mode may be identified. Because an instruction using the auto increment addressing mode or the base plus offset addressing mode operates on a same register, it may be possible to determine (e.g., verify) that a post-incremented or offset address may access a same cache line (e.g., a same way) of the data cache 102 as a previous execution of the instruction. Accordingly, the processor system 100 may generate, maintain, and use a prediction table 152, as described below, to predict way accesses for one or more instructions.

The data cache 102 may include the data array 110 and a multiplexer 160. The data cache 102 may be configured to store (in a cache line) recently or frequently used data. Data stored in the data cache 102 may be accessed more quickly than data accessed from another location, such as a main memory (not shown). In a particular embodiment, the data cache 102 is a set-associative cache, such as a four-way set-associative cache. Additionally or alternatively, the data cache 102 may include the control logic 150, the program counter 170, the tag array 180, the decode logic 190, or a combination thereof.

The data array 110 may be accessed during execution of an instruction (executed by the processor system 100). The instruction may be included in a program (e.g., a series of instructions) and may or may not be included in a loop (e.g., a software loop) of the program. The data array 110 includes a plurality of sets (e.g., rows) that each include a plurality of ways (e.g., columns), such as a first way, a second way, a third way, and a fourth way as depicted in FIG. 1. Each of the ways may be associated with multiple cache lines within a column of the data cache 102 and associated with a corresponding cache line 120a-d (e.g., a single cache line) of each set of the data cache 102. The plurality of ways may be accessed during execution of the program. Each way of the plurality of ways may include a driver 140a-d (e.g., a line driver) and a data line 130a-d that corresponds to multiple cache lines (e.g., storage locations) within a column of the data array 110. For example, the first way may be associated with a cache line A 120a and includes a first driver 140a and a first data line 130a, the second way may be associated with a cache line B 120b and includes a second driver 140b and a second data line 130b, the third way may be associated with a cache line C 120c and includes a third driver 140c and a third data line 130c, and the fourth way may be associated with a cache line D 120d and includes a fourth driver 140d and a fourth data line 130d.

Each driver 140a-d may enable data stored, in a corresponding cache line 120a-d (e.g., a corresponding cache block) to be read (e.g., driven) from the data array 110 via a corresponding data line 130a-d and provided to the multiplexer 160. The content stored in a particular cache line of the cache lines 120a-d may include multiple bytes (e.g., thirty-two (32) bytes or sixty-four (64) bytes). In a particular embodiment, the particular cache line may correspond to a block of sequentially addressed memory locations. For example, the particular cache line may correspond to a block of eight sequentially addressed memory locations (e.g., eight 4-byte segments).

The decode logic 190 may receive one or more instructions (e.g., a series of instruction) to be executed by the processor system 100. The decode logic 190 may include a decoder configured, to decode a particular instruction of the one or more instructions and to provide the decoded instruction (including an index portion 172, a tag portion 174, or a combination thereof) to the program counter 170. The decode logic 190 may also be configured to provide instruction data associated with the particular instruction to the control logic 150, such as by sending data or modifying one or more control registers. For example, the instruction data may include the decoded instruction (e.g., the index portion 172 and/or the tag portion 174), one or more way prediction characteristics, an instruction type of the particular instruction (e.g., a load type, a store type, etc.), a mode (e.g., an addressing mode) of the particular instruction, one or more register locations of a register file (not shown) associated with the particular instruction, an increment value (and/or an offset value) associated with the particular instruction, an address value associated with the particular instruction, whether the particular instruction initiates a loop (e.g., a software loop), ends the loop, or is included in the loop, or a combination thereof. The one or more way predication characteristics may indicate that the particular instruction has a predictable next address (e.g., a predictable access pattern that indicates that an effective address for the next instruction to be executed will be available from a same cache line (e.g., via a same way)). For example, the one or more way predication characteristics may comprise a characteristic (e.g., an addressing mode, an instruction type, a position within a loop, etc) of the particular instruction, a component (e.g., an op-code, an operand, a bit value, an increment value, a register value, etc) of the particular instruction, or a combination thereof. The addressing mode of the particular instruction may include an auto increment addressing mode or a base plus offset addressing mode. The instruction type of the particular instruction may include a load type or a store type.

The program counter 170 may identify an instruction to be executed based on the decoded instruction received from the decode logic 190. The program counter 170 may include the index portion 172 (e.g., a set index portion) and the tag portion 174 that may be used to access the data cache 102 during an execution of the instruction. Each time an instruction is executed, the program counter 170 may be adjusted (e.g., incremented) to identify a next instruction to be executed.

The control logic 150 may include the way prediction table 152, a tag array enable 154, and a driver enable 156. The control logic 150 may be configured to receive the instruction data from the decode logic 190 and access the way prediction table 152 based on at least a portion of the instruction data, as described further below. For example, the control logic 150 may selectively access the way prediction table 152 based on the one or more way prediction characteristics received from the decode logic 190.

The way prediction table 152 may include one or more entries 153 that each includes one or more fields. Each entry 153 may correspond to a different instruction and include a program counter (PC) field, a predicted way (WAY) field, a register location identifier (REG) field, a valid/invalid field (V/I), or a combination thereof. For a particular entry, the PC field may identify a corresponding instruction executed, by the processor system 100. The WAY field (e.g., a predicted way field) may include a value (e.g., a way field identifier) that identifies a way (of the data array 110) that was previously accessed (e.g., a "last way" accessed) the last time the corresponding instruction was executed. The REG field may identify a register location of a register file (not shown) that was modified the last time the corresponding instruction was executed. For example, the register location may be a base register location of the instruction that was modified based on an execution of the instruction as part of a post-increment operation. The V/I field may identify whether a value of the WAY field is valid or invalid. For example, the V/I field may indicate whether the value of the WAY field may be used as a predicted way. Alternatively and/or additionally, the V/I field may indicate whether an entry is valid or invalid. The way prediction table 152 may be maintained (e.g., stored) at a processor core of the processor system 100 and/or may be included in or associated with a prefetch table of the data cache 102. In a particular embodiment, each entry in the way prediction table 152 includes a program counter identifier (e.g., the PC field), a particular register location identifier (e.g., the REG field), and a particular predicted way identifier (e.g., the WAY field).

The control logic 150 may be configured to access the instruction data (e.g., instruction data that corresponds to an instruction to be executed) provided by the decode logic 190. Based on at least a portion of the instruction data, such as the one or more way prediction characteristics, the control logic 150 may determine whether the way prediction table 152 includes an entry that corresponds to the instruction. For example, the control logic 150 may selectively read, the way prediction table 152 in response to receiving an indication that an instruction type of the instruction is a load type or a store type. In a particular embodiment, the control logic 150 does not read the way prediction table unless the instruction type is the load type or the store type. The control logic 150 may determine whether the way prediction table 152 includes an entry 153 that corresponds to the instruction based on the PC fields of the way prediction table 152. In another particular embodiment, the control logic 150 selectively reads the way prediction table 152 in response to receiving an indication that an addressing mode of the instruction is an auto increment addressing mode or a base plus offset addressing mode. In another particular embodiment, the control logic 150 selectively reads the way prediction table 152 in response to receiving an indication that the instruction is included in a loop.

Based on a determination that the way prediction table 152 does not include an entry 153 that corresponds to the instruction, and based on a determination that the instruction is associated with one or more way prediction characteristics for which way prediction is useful (e.g., has an auto increment address mode) the control logic 150 may generate (e.g., populate) a new entry 153 associated with the instruction in the way prediction table 152. The control logic 150 may identify a register location included in (e.g., identified by) the instruction and a way of the data array 110 that is accessed based on the instruction. The control logic 150 may populate the WAY field and the REG field of the new entry 153 based on the identified register location and the identified way, respectively. Accordingly, a next time the instruction is to be executed, (e.g., during a next iteration of the loop), the control logic 150 may identify the way accessed during the previous execution of the instruction based on the WAY field. In particular, when the entry is generated, the value of the WAY field may be set to indicate a way accessed based on an execution of the instruction that caused the entry to be generated. The REG field may be used by the control logic 150 to maintain the way prediction table 152 as described further herein.

The control logic 150 may also predict whether a subsequent (e.g., a next) execution of the instruction will access a same way as the execution of the instruction that caused the entry to be generated. For example, as described in further detail with respect to FIG. 1, the control logic 150 may perform an arithmetic operation to predict (e.g., verity) whether a next execution of the instruction will access a same cache line as the execution, such as according to an auto-increment addressing mode instruction or a base plus offset addressing mode instruction, and thus the same way. When a determination (e.g., a prediction) is made that the incremented address would not be in the same cache line accessed during the execution of the instruction, the control logic 150 may set the V/I field (e.g., a validity bit) of the new entry as invalid to indicate that the value of the WAY field may not be relied on to indicate a predicted way to be used during the subsequent execution of the instruction. When a determination (e.g., a prediction) is made that the incremented address would, be in the same cache line accessed during the execution of the instruction (e.g., the execution of the instruction accessed the cache line A 120a and a value associated with the incremented address is located in the cache line A 120a), the control logic 150 may set the V/I field (e.g., a validity bit) of the new entry to valid to indicate that the value of the WAY field indicates a predicted way to be used during the subsequent execution of the instruction.

The control logic 150 may use the way prediction table 152 to predict a way for an instruction to be executed. The control logic 150 may selectively read the way prediction table 152 to identify the entry 153 of the way prediction table 152 that corresponds to the instruction based on the PC field of each entry 153. When the control logic 150 identifies the corresponding entry 153 and if the entry 153 is indicated as valid, the control logic 150 may use the value of the WAY field for the entry 153 as the way prediction by providing (or making available) the value of the WAY field to the driver enable 156 and may provide (or make available) the value of the V/I field to the tag array enable 154.

The driver enable 156 may be configured to selectively activate (e.g., turn on) or deactivate (e.g., turn off) one or more of the drivers 140a-d based on a predicted, way identified in the way prediction table 152. In a particular embodiment, when the value of the WAY field provided to the driver enable 156 is a null value (e.g., a zero value), the driver enable 156 enables all of the drivers 140a-d. In another particular embodiment, the driver enable 156 may use the predicted way from the identified (e.g., corresponding) entry 153 when a value of the V/I field, of the entry 153 indicates that a value of the WAY field of the entry 153 may be used as the way prediction. Additionally, the driver enable 156 may selectively disable at least one driver 140a-d of one or more ways that are not the predicted way indicated by the WAY field. In a particular embodiment, the WAY field may include one or more bits (e.g., a bitmask) that indicate the predicted way, and the driver enable 156 may apply the bitmask to the plurality of drivers 140a-d to selectively enable or disable each driver of the plurality of drivers 140a-d.

The tag array enable 154 may be configured to selectively activate (e.g., enable) or deactivate (e.g., disable), via a switch 176 (or other mechanism), a tag lookup operation at the tag array 180 to identify a way (e.g., a cache line 120a-d) to be selected based on the instruction. When the tag enable portion 154 determines that the value of the V/I field indicates that the value of the WAY field may be used as a way prediction, the tag-enable portion 154 may selectively disable the tag lookup operation via operation of the switch 176. When the value of the V/I field indicates that the value of the WAY field may not be used as the way prediction, the tag array enable 154 may selectively enable the switch 176 so that a tag lookup operation is performed in parallel (e.g., concurrently) with the drivers 140a-d being enabled.

Multiple combinations of a value of the WAY field provided to the driver enable 156 and a value of the V/I field provided to the tag array enable 154 may be provided to direct operation of the driver enable 156 and/or the tag array enable 154. For example, the value of the WAY field may be a null value (e.g., a zero value) that causes the driver enable 156 to activate (e.g., turn on) all of the drivers 140a-d regardless of a value of the WAY field, and in this case the tag array enable 154 may selectively enable or selectively disable the switch 176. As another example, when the value of the V/I field indicates that the value of the WAY field may not be relied upon as the way prediction, the driver enable 156 may turn on all of the drivers 140a-d, and the tag array enable 154 may selectively enable the switch 176. As a further example, when the value of the V/I field indicates that the value of the WAY field may be relied upon (e.g., used) as the way prediction, the driver enable 156 may activate (e.g., turn on) a single line driver of the plurality of drivers 140a-d and the tag array enable 154 may selectively enable or selectively disable the switch 176. Alternatively or additionally, the tag array enable 154 may selectively enable or disable the switch 176 based on whether the register file is being tracked (e.g., monitored), whether an instruction corresponding to the entry providing the value of the WAY field and the value of the V/I field is identified as being included in a loop (e.g., based on the instruction data received at the control logic 150), or a combination thereof.

The control logic 150, or other logic coupled to the control logic 150, may include tracking logic that tracks (e.g., monitors) whether any instruction modifies (e.g., changes) data at a register location identified in the way prediction table 152. The tracking logic may identify a value of the register location that was modified and provide an identification of the register location to the control logic 150. The control logic 150 may read the way prediction table 152 to determine whether a particular entry 153 includes a REG field having a value that corresponds to the register location. Based on a determination that the particular entry 153 includes such a REG field, the control logic 150 may determine whether the PC field of the particular entry 153 corresponds to the particular instruction that modified the register location and, when the particular entry 153 does not correspond to the particular instruction, the control logic 150 may set a value of the V/I field (e.g., invalid) of the particular entry 153 to indicate that the value of the WAY field of the particular entry may not be relied upon (e.g., the used) as a way prediction or may remove (e.g., delete) the particular entry 153.

During operation of the processor system 100, the decode logic 190 and/or the control logic 150 may determine whether the way prediction table 152 includes an entry that corresponds to an instruction to be executed. When the way prediction table 152 does not include the entry, the control logic 150 may generate a new entry in the way prediction table 152. When the way prediction table 152 includes the entry, the control logic 150 may identify one or more values of one or more fields of the entry. When the one or more fields indicate that the entry is not valid (e.g., the entry may not be used for way prediction), the control logic 150 may enable all of the plurality of drivers 140a-d of the data array 110 and enable a way select signal to be provided, to the multiplexer 160 based an output of the tag array 180. When the one or more fields indicate that the entry is valid, the control logic 150 may use a value of a WAY field of the entry to selectively enable and/or disable one or more of the plurality of drivers 140a-d and to control a selection by the multiplexer 160. The control logic 150 may update one or more entries of the way prediction table 152 based on a prediction that an incremented address would access a cache line corresponding to a way that is different than a way indicated by a WAY field or based on identifying a modification to a register location identified, in the way prediction table 152. An example of operation of the processor system 100 is described below with reference to FIG. 4.

By maintaining the way prediction table 152 for instructions executed by the processor system 100, one or more drivers 140a-d of the data array 110 of the data cache 102 may be selectively disabled based on a way prediction and a power benefit may be realized during a data access of the data cache 102. Additionally, by tracking and storing a register location (e.g., the REG field) associated with each entry 153, the control logic 150 may avoid potential mispredictions when an instruction other than the instruction corresponding to the entry modifies data at a particular register location identified, by a REG field of any entry in the way prediction table 152. Additional power benefits may be realized by selectively disabling the tag lookup operation.

Figure 2:
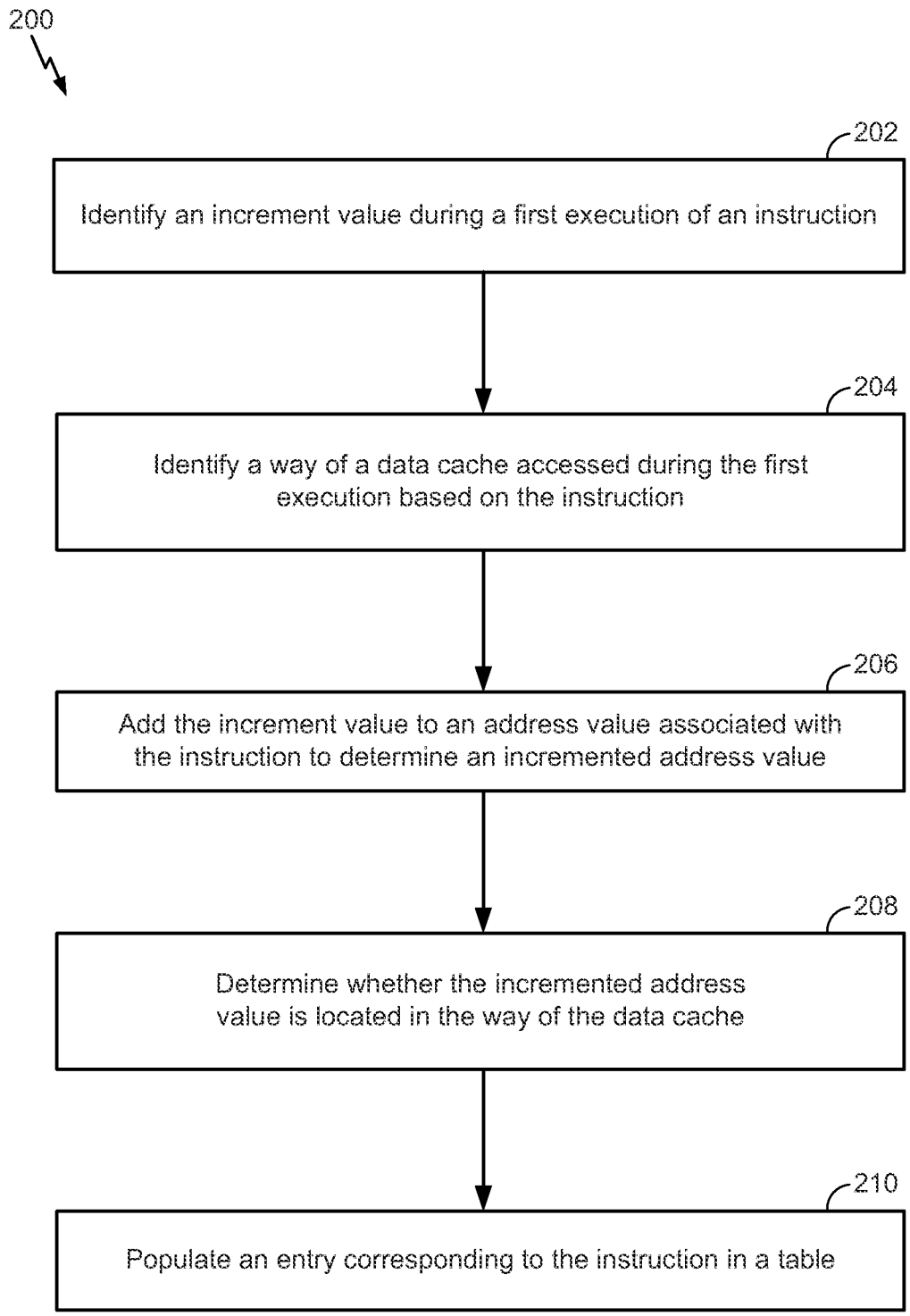
FIG. 2 is a flow diagram of a first illustrative embodiment of a method to perform way prediction for a data cache.

Referring to FIG. 2, a flow diagram of a first illustrative embodiment of a method 200 to perform way prediction associated with a data cache is illustrated. For example, the data cache may include the data cache 102 of FIG. 1. In a particular embodiment, the method 200 may be performed by the control logic 150 of FIG. 1.

An increment value is identified during a first execution of an instruction, at 202. The increment value may be associated with the instruction using an auto increment addressing mode. The increment value may be determined (e.g., identified) by decode logic, such as the decode logic 190 of FIG. 1. The increment value may be included in instruction data that is provided from the decode logic to control logic, such as the control logic 150 of FIG. 1. The control logic may receive the instruction data and identify the increment value. The control logic may also determine whether the instruction is associated with one or more way prediction characteristics that indicate the instruction may have a predictable access pattern. In a particular embodiment, the control logic identifies the increment value of the instruction, after making a determination that the instruction is associated with the one or more way prediction characteristics.

A way of the data cache accessed based on the instruction during a first execution of the instruction is identified, at 204. For example, the data cache may be the data cache 102 of FIG. 1. The control logic may identify the way accessed during the first execution of the instruction.

The increment value is added to an address value associated with the instruction to determine an incremented address value, at 206. The control logic may add the increment value to the address value associated with the instruction to determine the incremented address. In a particular embodiment, the address value may be an address value stored at a register location identified by the instruction. The register location may be identified by the control logic based on the instruction data provided by the decode logic.

A determination is made whether the incremented address value is located in the way of the data cache, at 208. The control logic may determine whether a subsequent (e.g., a next) execution of the instruction is predicted to access a same way as an execution (i.e., the first execution) of the instruction.

An entry corresponding to the instruction is populated in the table, at 210. The entry may be populated in the table in response to determining that the incremented address is located in the way of the data cache. The control logic may populate (e.g., generate) the entry corresponding to the instruction in a way prediction table, such as the way prediction table 152 of FIG. 1. In a particular embodiment, generation (e.g., population) of the entry in the table is conditioned on one or more conditions (e.g., an auto increment addressing mode, a type of the instruction, the instruction being in a loop) associated with the instruction being satisfied prior to the entry being generated (e.g., populated). The control logic may populate one or more fields of the entry such that the entry identifies the instruction (e.g., a PC field, value), the way of the data cache accessed during the first execution of the instruction (e.g., a WAY field value), the register location (e.g., a REG field value), whether the subsequent (e.g., the next) execution of the instruction is predicted to access the same cache line (e.g., a V/I field value), or a combination thereof.

By generating (e.g., populating) the entry for the instruction in the way prediction table, a way accessed based on the instruction may be recorded and tracked. The recorded way may be used as a way prediction by the control logic during one or more subsequent executions of the instruction to selectively enable and/or disable one or more drivers of the data cache (e.g., less than all of the drivers are turned on) to realize a power benefit during a data access of the data cache.

Figure 3:
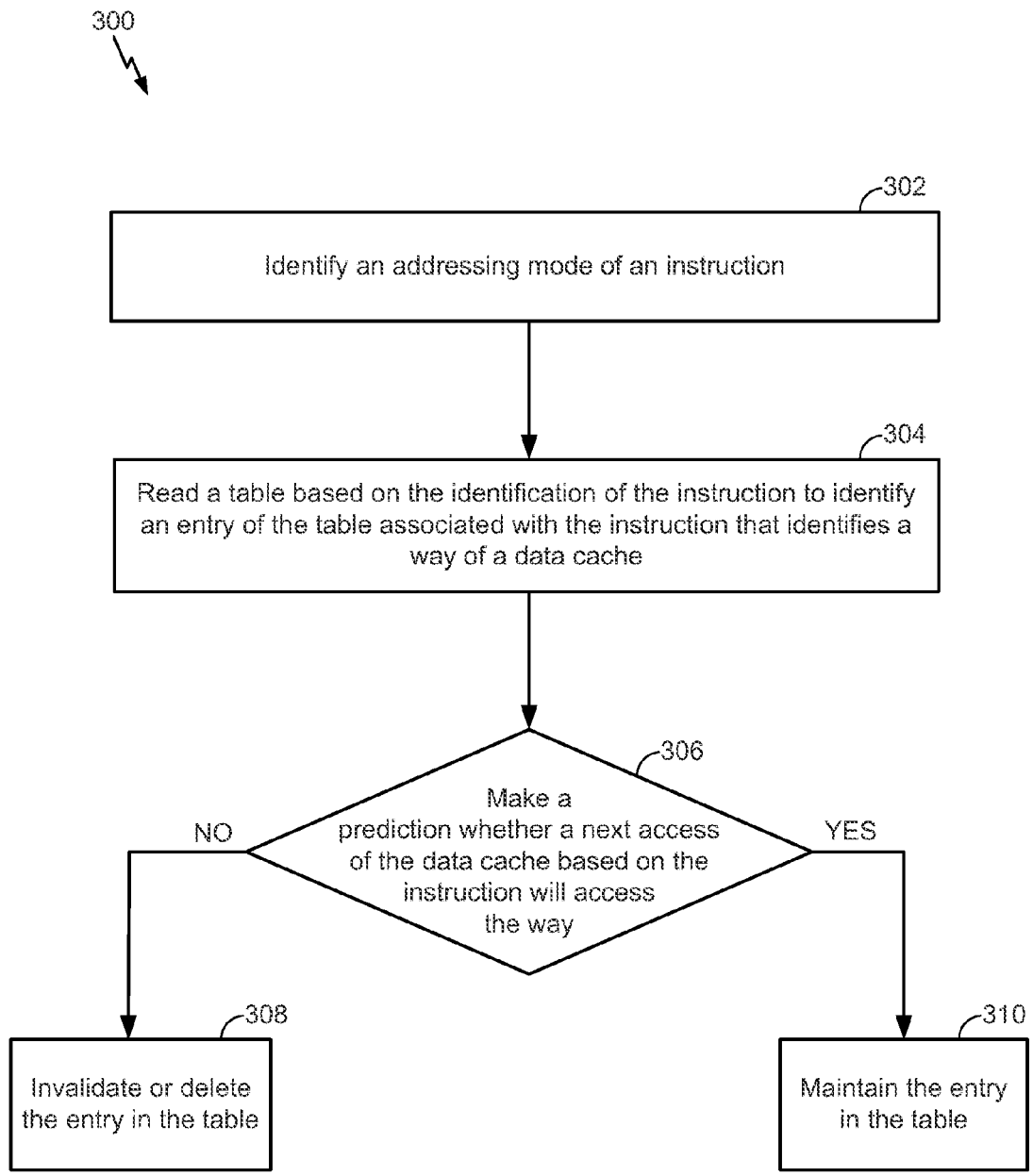
FIG. 3 is a flow diagram of a second illustrative embodiment of a method to perform way prediction for a data cache.

Referring to FIG. 3, a flow diagram of a second illustrative embodiment of a method 300 to perform way prediction associated with a data cache is illustrated. For example, the data cache may include the data cache 102 of FIG. 1. In a particular embodiment, the method 300 may be performed by the control logic 150 of FIG. 1.

An addressing mode of an instruction is identified, at 302. In a particular embodiment, the addressing mode of the instruction is identified as an auto increment addressing mode. The instruction having the auto increment addressing mode may identify an increment value and a register location that stores an address associated with the instruction. The addressing mode may be determined (e.g., identified) by control logic, such as the control logic 150 of FIG. 1, based on instruction data received from decode logic, such as the decode logic 190. Additionally, a type (e.g., an instruction type) associated with the instruction may be determined. For example, the type may be determined to be a load type or a store type. The type may be determined (e.g., identified) by the control logic.

A table is read, based on the identification of the instruction, to identify an entry of the table associated with the instruction that identifies a way of a data cache, at 304. The control logic may determine whether the table includes the entry associated with the instruction that identifies a way of a data cache. For example, the control logic may access the table and read the entry from the table based on the instruction. The table may include the way prediction table 152 of FIG. 1. When a determination is made that the table includes the entry, the control logic may determine whether the entry is identified as valid or invalid based on a value of a validity bit included in a V/I field associated with the entry. The V/I field may be included in the entry or stored at a register location or a buffer that is distinct from the table. The value of the validity bit may enable the control logic to determine whether the entry or a portion (e.g., at least one field) of the entry is valid to provide a way prediction for the instruction. Based, on the entry, the control logic may use a way prediction included in the entry to selectively enable and/or disable one or more drivers of the data cache (e.g., less than all of the drivers are turned on). By selectively disabling one or more drivers of the data cache, a power benefit is realized during a data access of the data cache.

A prediction whether a next access of the data cache based on the instruction will access the same way is made, at 306. For example, the control logic may predict whether the next access of the data cache based on the instruction will access the way identified by the entry. The control logic may make the predication by adding an increment value associated with the instruction to an address of (e.g., stored at) a register location associated with the instruction to determine an incremented address and by determining whether the incremented address is located, in a same cache line of the data array as the address.

When the predication is made that the next access of the data cache will not access the way, processing advances to 308, where the entry in the table is invalidated, or deleted (e.g., removed). For example, the control logic may remove the entry or indicate that the entry of the table is invalid based on a determination that the incremented address will be in a different cache line of the data cache than a cache line that includes the address (e.g., the address incremented to generate the incremented, address). Alternatively, when the predication is made that the next access of the data cache will access the way, processing advances to 310, where the entry in the table is maintained. For example, the control logic may maintain the entry of the table as valid to provide a way prediction based on a determination (e.g., a prediction) that the incremented address is in the same cache line of the data array as the address. The control logic, or logic other than the control logic, may monitor (e.g., track) the register file including the register location. As a result of monitoring (e.g., tracking) the register file, the control logic may invalidate or delete the entry in response to contents of the register location being changed. The contents of the register location may be changed by another instruction.

By accessing the table, a previous way of the data cache accessed based on the instruction may be used as a way prediction for an execution of the instruction. Additionally, the control logic may determine (e.g., predict) whether a subsequent (e.g., a next) execution of the instruction will access a same cache line as the execution of the instruction. Based, on the determination of whether or not the subsequent execution will access the same cache line, the control logic may remove the entry, update one or more fields of the entry, and/or maintain one or more fields of the entry. By updating and maintaining the entries of the table, the table may be used and relied upon to make one or more way predictions and to avoid mispredictions.

Figure 4:
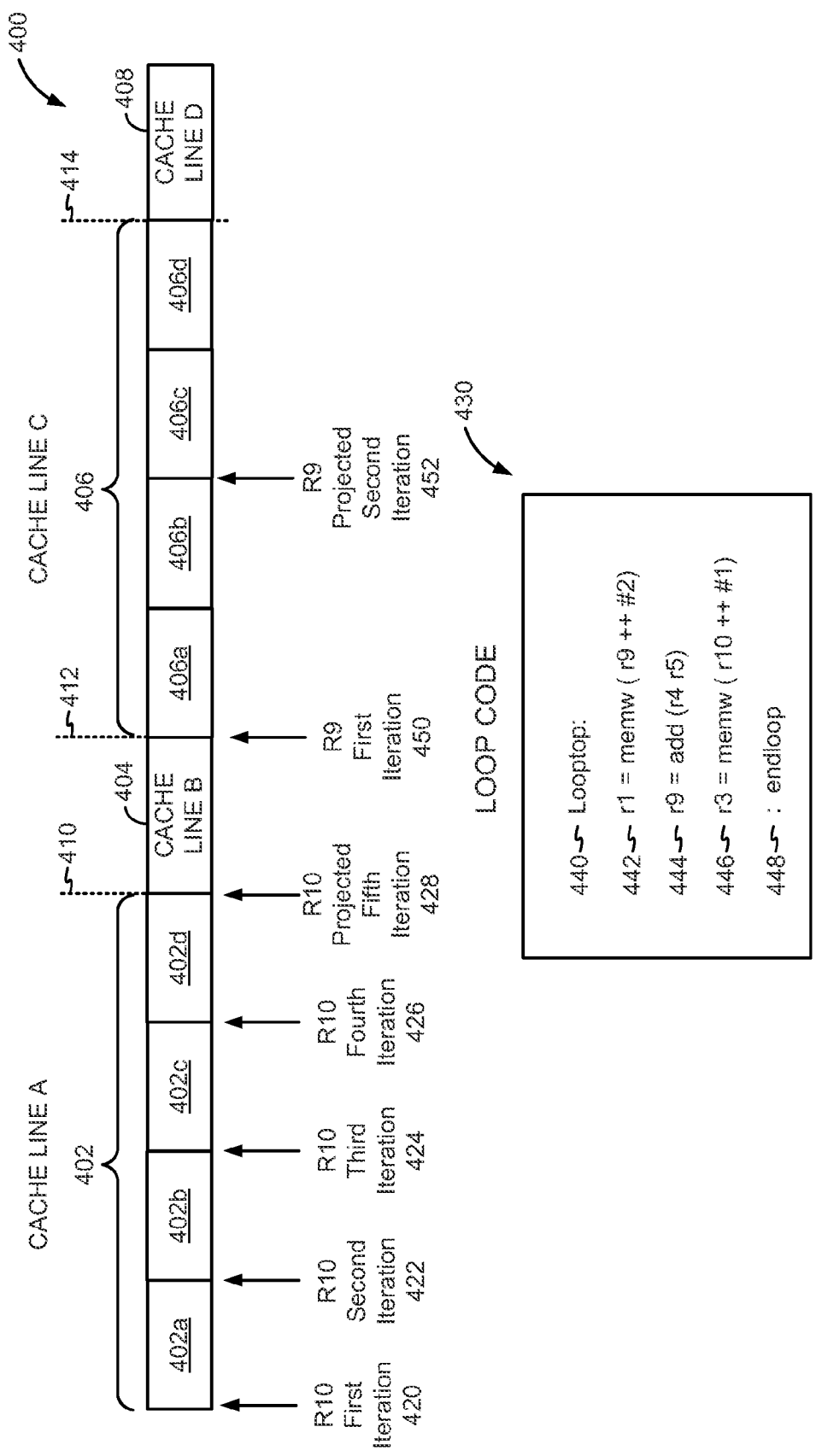
FIG. 4 is a block diagram of a data array of a data cache used for way predictions and an illustrative embodiment of program code including instructions in a loop.

Referring to FIG. 4, a particular illustrative embodiment of a row 400 of a data cache is shown. For example, the data cache may include the data cache 102 of FIG. 1. The row 400 may include a first cache line A 402, a second cache line B 404, a third cache line C 406, and a fourth cache line D 408, each separated by cache line boundaries 410-414. For example, the four cache lines 402-408 may correspond to the cache lines 120a-d of FIG. 1. Although four representative cache lines A-D are shown, it should be understood that the row 400 may include more than four cache lines or less than four cache lines. Each of the cache lines 402-408 may include a plurality of segments. For example, the first cache line A 402 includes a first segment 402a, a second segment 402b, a third segment 402c, and a fourth segment 402d. In a particular embodiment, each cache line 402-408 includes a same number of segments. Each of the cache lines 402-408 may be associated with a corresponding way.

To illustrate operation and usage of the row 400, an illustrative embodiment of representative computer instructions including a representative program loop (e.g., loop code 430) are shown in FIG. 4. The instructions include loop code 430 that starts with a loop top identifier 440. The loop includes three instructions 442, 444, and 446. The loop ends with an end loop designator 448. Not all aspects of the program loop are shown for purposes of providing a simplified example. For example, the number of loop iterations and a loop end condition has been omitted for brevity purposes.

A first instruction 442 is an illustrative load type instruction including an auto increment addressing mode (e.g., a post-increment load). In a particular embodiment, the first instruction 442 is a memory write instruction that accesses a register location R9 that stores a memory address and uses the memory address in register location R9 to load contents (e.g., data) corresponding to the memory address from the data cache into a register location R1. The register file (not shown) may include a plurality of register locations. After the contents identified by the register location R9 are loaded into the register location R1, a value of the memory address of the register location R9 is auto incremented by two (e.g., a post-increment of two). Accordingly, the first instruction 442 may be regarded as having an increment value of two and operating on a base register R9. To load the contents of the register location R9 into the register location R1, a particular cache line of the data cache may be accessed. The particular cache line is associated with a particular way and a particular driver of the data array.

The second instruction 444 is a representative arithmetic instruction. In a particular embodiment, the second instruction 444 is an addition instruction that identifies a register location R4 that stores a first memory address (having corresponding first contents (e.g., data)) and a register location R5 that stores a second memory address (having corresponding second contents). The first contents corresponding to the first memory address of the register location R4 and the second contents corresponding to the second memory address of the register location R5 may be added together and the sum may be stored as contents (e.g., data) corresponding to a third memory address that is stored in the register location R9 based on the second instruction 444.

The third instruction 446 may include another load type instruction including the auto increment addressing mode. For example, execution of the third instruction 446 may access a register location R10 (e.g., a base register of the third instruction 446) that stores a memory address and uses the memory address in the register location R10 to load contents (e.g., data) corresponding to the memory address from the data cache into a register location R2. After the contents are loaded into the register location R2, a value of the memory address of the register location R10 may be incremented by one (e.g., a post increment of one).

Executing the loop code 430 includes executing the instructions 442, 444, and 446 one or more times (e.g., one or more iterations). During the first iteration of the loop code 430, the first instruction 442 is executed. Since the first instruction 442 includes one or more way prediction characteristics, such as an auto increment addressing mode, control logic (not shown) may generate an entry that corresponds to the first instruction 442 in a way prediction table. For example, the control logic 150 of FIG. 1, or other control logic not illustrated, may generate an entry in the way prediction table 152. In a particular embodiment, the control logic may generate the entry in the way prediction table after determining that the way prediction does not include an entry corresponding to the first instruction 442.

Since the first instruction 442 includes the auto increment addressing mode, the control logic may identity the increment value of two. Since the increment value of two is less than a size of cache lines 402-408 (e.g., a size of four), the control logic may predict that the next way accessed would correspond to (e.g., stay within) the same cache line. Based on a prediction that the same way will be accessed during a next iteration (e.g., a next execution of the first instruction 442), the way may be identified as a way prediction for a next execution of the first instruction 442.

To illustrate, during the first iteration of the loop code 430, the contents of the register location R9 may point to a first (sequential) segment 406a of the third cache line C 406, at 450. For example, the third cache line C 406 may comprise four segments, such as the first segment 406a, a second segment 406b, a third segment 406c, and a fourth segment 406d. Accordingly, incrementing the contents of the register location R9 by the increment value of two would result in the contents of the register location R9 pointing to the third (sequential) segment 406c of the third cache line C 406, at 452. Thus, the way prediction for the first instruction 442 would identify the way (corresponding to the third cache line C 406) used during execution of the first instruction 442 during the first iteration of the loop code 430. Thus, as described with respect to FIG. 1, a new entry for the first instruction 442 is added to the way prediction table 152 by the control logic 150. For example, a particular entry may be generated to include one or more of the following fields: PC=0x10148 (e.g., corresponding to the first instruction 442); WAY=3; REG=R9; and V/I=valid (e.g., a data value of "1").

The control logic may set a validity bit (e.g., to indicate valid) of the V/I field of the entry based on the determination that the subsequent execution of the instruction will access the same cache line. In another embodiment, the WAY field of the new entry may only be populated to identify the way accessed when the determination (e.g., the prediction) is made that the subsequent execution will access the same cache line. When a prediction is made that the subsequent execution will not access the same cache line, the control logic may set the WAY field of the new entry to a null value (e.g., a zero value). In another particular embodiment, the entry is only generated in the way prediction table when the prediction is made that the subsequent execution will access the same cache line.

Generation of a new entry based on the instruction may further be conditioned on (e.g., based on) one or more additional way prediction characteristics being identified (e.g., one or more additional determinations being made by the control logic 150 of FIG. 1 based on the instruction data). For example, the new entry may only be generated (e.g., populated) when the instruction is associated with an auto increment addressing mode and/or a base plus offset addressing mode. As another example, the new entry may only be generated (e.g., populated) when the instruction is included in a loop. In particular, the new entry may be generated when the instruction is a first instance of the instruction in the loop. In a particular embodiment, no entry is generated when the instruction is not included in a loop.

When an instruction uses the base plus offset addressing mode, the control logic 150 may not be operable to make a prediction of whether the subsequent execution of the instruction will access the same cache line based on a first execution of the instruction. For example, unlike the auto increment addressing mode, executing the base plus offset addressing mode may not increment an address location by a predetermined, value (e.g., a constant) during each successive execution of the instruction (e.g., each successive iteration of the loop). At least two executions of the instruction may be needed to determine a stride (e.g., an offset) of an instruction using the base plus offset addressing mode. Accordingly, when the instruction uses the base plus offset addressing mode a new entry may be generated during a first execution of the instruction, but a value of the V/I field of the new entry may not be able to be set to indicate the value of the WAY field may be used as the predicted way until a second execution (e.g., a next execution after the initial execution) of the instruction. In an alternative embodiment, the entry may not be generated in the way prediction table 152 based on a first execution of the instruction when the instruction uses the base plus offset addressing mode. Rather, based on the first execution of the instruction, a value associated with a PC field and a value associated with a WAY field, may be identified for a potential new entry associated with the instruction and the value associated with the PC field and the value associated with the WAY field may be maintained in a location (and/or structure) that is different than the way prediction table 152. For example, the location may include a buffer or a register associated with control logic, such as the control logic 150. The entry associated with the instruction using the base plus offset addressing mode may be generated based on an execution of the instruction that is subsequent to the first execution.

In a particular embodiment, the control logic 150, or other control logic, may include tracking logic that tracks each register location of the register file (not shown) that is identified as a register (e.g., identified in a REG field) within the way prediction table, such as the way prediction table 152. In a particular embodiment, the control logic 150, or other control logic, only tracks register locations of the register file that are identified in a corresponding REG field of a valid entry. For example, since the register location R9 was used by the first instruction 442 and since the register location R9 was associated with an entry added to the way prediction table 152, the tracking logic would monitor any instructions that modify the value of the register location R9. In a particular illustrative example, the second instruction 444 changes (e.g., modifies) the value of the register location R9. Thus, the tracking logic may monitor one or more instructions, such as the second instruction 444, and invalidate (e.g., set a V/I field to invalid) or delete (e.g., remove) the entry in the way prediction table 152 corresponding to the first instruction 442 in response to detecting that the value of the register location R9 has been changed by the second instruction 444. Thus, upon a subsequent execution (e.g., a next execution) of the first instruction 442, the way prediction table 152 would not include a valid entry (or any entry) associated with the first instruction 442 by which a way prediction may be made.

Proceeding with the loop code 430, the third instruction 446 may include the auto increment addressing mode. The control logic may identify the increment value of one and a register location R10 (e.g., a base register) of the third instruction 446. During the first iteration of the loop code 430, the contents of the register location R10 may point to a first (sequential) segment 402a of the first cache line A 402, at 420. Since the increment value of one is less than a size of the first cache line A 402 (e.g., the first cache line A 402 includes a size of four), the control logic may predict that the next way would stay within the same cache line 402 at a second (sequential) segment 402b, at 422. Based, on a prediction that the same way will be accessed, the way may be identified, as a way prediction for a next execution of the third, instruction 446. Thus, as described with respect to FIG. 1, a new entry for the third instruction 446 is added to the way prediction table 152 by the control logic 150. The first iteration of the loop ends at the end loop designator 448.

During a second iteration of the loop code 430, the first instruction 442 is executed a second time. The control logic 150 may search the way prediction table 152 for a valid entry that corresponds to the first instruction 442. Since an entry was generated and stored within the way prediction table 152 during the first iteration of the loop code 430, the way prediction table 152 has an entry that includes a PC field value associated with the program counter value corresponding to the first instruction 442. However, since the tracking logic invalidated the entry, the result of the look up (e.g., reading the entry of) the way prediction table 152 based on the first instruction 442 would be an indication of an invalid entry. The invalid entry would indicate that the control logic 150 cannot solely rely upon the value of the WAY field (e.g., a way prediction) indicated by the entry in the way prediction table 152. Thus, the control logic 150 would selectively activate (e.g., enable) a search (e.g., a tag lookup operation) of the tag array 180 based on the memory address stored in the register location R9.

In a particular embodiment, the control logic uses the value of the WAY field, indicated by the entry in the way prediction table 152 while concurrently (e.g., in parallel) enabling the tag lookup operation. Concurrently enabling the tag lookup operation enables the control logic to determine whether a misprediction (e.g., predicting an incorrect way) occurs based on the value of the WAY field. In another embodiment, the control logic enables drivers of all the ways concurrently (e.g., in parallel) thus enabling the tag lookup operation to ensure that no performance penalty from a misprediction occurs as a result of relying on the value of the WAY field for the invalid entry.

Continuing with execution through the loop code 430, the addition operation corresponding to the second instruction 444 is executed again and then processing proceeds to execute the third instruction 446. Since the third instruction 446 includes the auto increment addressing mode, the control logic 150 accesses (e.g., reads) the way prediction table 152 and identifies the previously stored, entry associated with the third instruction 446 (corresponding to the register location R10). In this case, the entry associated with the third instruction 446 is valid and the control logic 150 may generate a way select signal and generate a signal from the driver enable 156 to activate the selected (e.g., predicted) way (without activating any of the other ways). In this manner, the second iteration of the loop code 430, which involves a second execution of the third instruction 446, beneficially selects the previously stored way (corresponding to the previously accessed first cache line A 402) used during the first execution of third instruction 446 in the loop code 430. Accordingly, the previously stored way may be used as a way prediction and the control logic 150 may enable (e.g., selectively enable) a single driver of a plurality of drivers, such as the plurality of drivers 140a-d of FIG. 1, based on the way prediction. By selectively enabling the single driver (e.g., less than all of the plurality of drivers 140a-d), a power benefit may be realized during a data access of a data cache, such as the data cache 102 of FIG. 1.

During the second iteration of the loop code 430, the contents of the register location R10 may point to a second (sequential) segment 402b of the first cache line A 402, at 422. The control logic may predict that the next way associated with the third instruction 446 would stay within the same cache line 402 by calculating that the contents of the register location R10, when incremented by the increment value of one, would result in the contents of the register location R10 pointing to a third (sequential) segment 402c of the first cache line A 402, at 424, during a third iteration of the loop code 430. Since the predicted way of the third instruction 446 during the third iteration of the loop code 430 remains within the first cache line A 402, the value of the WAY field of the entry associated with the third instruction 446 may remain the same (e.g., the way corresponding to the first cache line A 402) and the entry associated with the third instruction 446 remains valid. Processing (e.g., execution) of the end loop designator 448 ends the second iteration of the loop code 430.

The loop code 430 may continue to be processed through additional iterations as described, above. For example the loop code 430 may go through a third iteration and a fourth iteration. During execution of the third instruction 446 in the third, iteration of the loop code 430, the register location R10 may point to the third (sequential) segment 402c of the first cache line A 402, at 424. During execution of the third instruction 446 in the fourth iteration of the loop code 430, the register location R10 may point to a fourth (sequential) segment 402d of the first cache line A 402, at 426. During execution of the third instruction 446 in the fourth iteration of the loop code 430, the control logic may predict that the next way associated with the third, instruction 446 (e.g., during a fifth iteration of the loop code 430) would not stay within the same cache line A 402 (e.g., cross beyond the boundary 410) by calculating that the contents of the register location R10, when incremented by the increment value of one, would result in the contents of the register location R10 pointing to the second cache line B 404, at 428. Since the predicted address of the third instruction 446 (associated with a next execution of the third instruction 446) is outside the first cache line A 402, the control logic may invalidate the way prediction of the entry or delete the entry associated with the third instruction 446 from the way prediction table. When the control logic invalidates the entry, the entry may be updated, with a new (valid) way prediction during a fifth iteration of the loop code 430. Alternatively, when the control logic deletes the entry, a new entry may be generated during the fifth iteration.

By generating (e.g., populating) and maintaining entries for one or more instructions in the way prediction table, a processor system may be enabled to implement (e.g., perform) way predictions (e.g., a way prediction technique) on a data cache. Performing way prediction on the data cache enables the processor system to realize a power benefit during certain data accesses of the data cache. For example, the way prediction technique may be utilized when one or more instructions have a predictable access pattern executed as part of a loop (e.g., executed several times). Such instructions may include instructions using an auto increment addressing mode or a base plus offset addressing mode.

Figure 5:
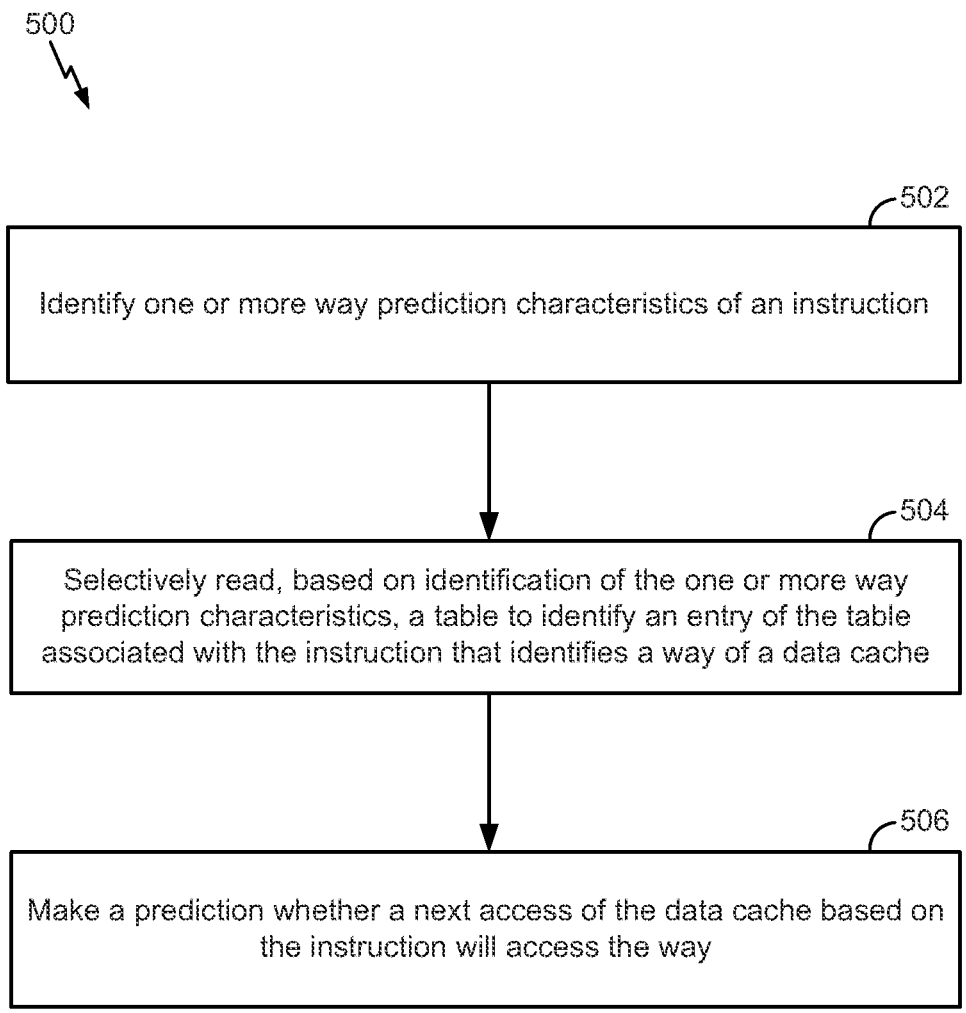
FIG. 5 is a flow diagram of a third illustrative embodiment of a method to perform way prediction for a data cache.

Referring to FIG. 5, a flow diagram of a third, illustrative embodiment of a method 500 to perform way prediction associated with a data cache is illustrated. For example, the data cache may include the data cache 102 of FIG. 1. In a particular embodiment, the method 500 may be performed, by the control logic 150 of FIG. 1.

One or more way prediction characteristics of an instruction are identified, at 502. The one or more way prediction characteristics may include an addressing mode of the instruction, an instruction type of the instruction, indication whether the instruction is included in a loop, or a combination thereof. For example, the one or more way prediction characteristics may be identified by control logic, such as the control logic 150 of FIG. 1, or by decode logic, such as the decode logic 190 of FIG. 1. In a particular embodiment, a determination is made whether the addressing mode of the instruction is an auto increment addressing mode or a base plus offset addressing mode. In another particular embodiment, a determination is made whether the instruction type of the instruction is a load type or a store type. In another particular embodiment, a determination is made whether the instruction is included in a loop of one or more instructions. The decode logic may provide an indication of the instruction type, the addressing mode, or whether the instruction is included in the loop to control logic.

A table is selectively read, based on identification of the one or more way prediction characteristics, to identify an entry of the table associated with the instruction that identifies a way of a data cache, at 504. Control logic may read a table to determine whether the table includes the entry corresponding to the instruction. For example, the control logic 150 of FIG. 1 may selectively read the way prediction table 152. The corresponding entry in the table may indicate the way (e.g., a predicted way) based on a value of one or more bits included in the entry (e.g., a value of a WAY field of the entry). The one or more bits may be applied as a mask to a plurality of drivers to selectively enable or disable each driver of the plurality of drivers. The control logic may also determine whether or not the entry is valid. In a particular embodiment, the predicted way is a same way as a previously accessed way based on a prior execution of the instruction. For example, the control logic may identify and retrieve the predicted way from the table and selectively enable and/or disable one or more drivers when the entry is valid. The one or more drivers, such as the drivers 140a-d, may be included, in a data cache, such as the data cache 102 of FIG. 1.

A prediction whether a next access of the data cache based on the instruction will access the way is made, at 506. For example, the control logic may perform an arithmetic operation to predict (e.g., verify) whether a next execution of the instruction will access a same cache line as the execution and thus the same way. When a determination (e.g., a prediction) is made that the incremented address would not be in the same cache line accessed during the execution of the instruction, a V/I field (e.g., a validity bit) of the entry may be set to indicate that the value of a WAY field, is invalid and may not be relied on to indicate a predicted way to be used during the subsequent execution of the instruction. When a determination is made that the incremented address would be in the same cache line, the V/I field of the entry may be set to indicate that the value of the WAY field is valid and may be relied on.

By accessing the table, a previous way of the data cache accessed based on the instruction may be used as a way prediction for an execution of the instruction. The previously stored way may be used as the way prediction and one or more drivers may be selectively disabled (e.g., turned off) based on the way prediction. By selectively disabling one or more drivers, less than all of the drivers are activated (e.g., turned on) and a power benefit may be realized during a data access of a data cache.

The method 200 of FIG. 2, the method 300 of FIG. 3, the method 500 of FIG. 5, or any combination thereof, may be implemented or otherwise performed by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, at least a portion of any of the method 200 of FIG. 2, the method 300 of FIG. 3, the method 500 of FIG. 5, or any combination thereof, may be implemented by a processor 610 that executes instructions stored in a memory 632, as described with respect to FIG. 6.

Figure 6:
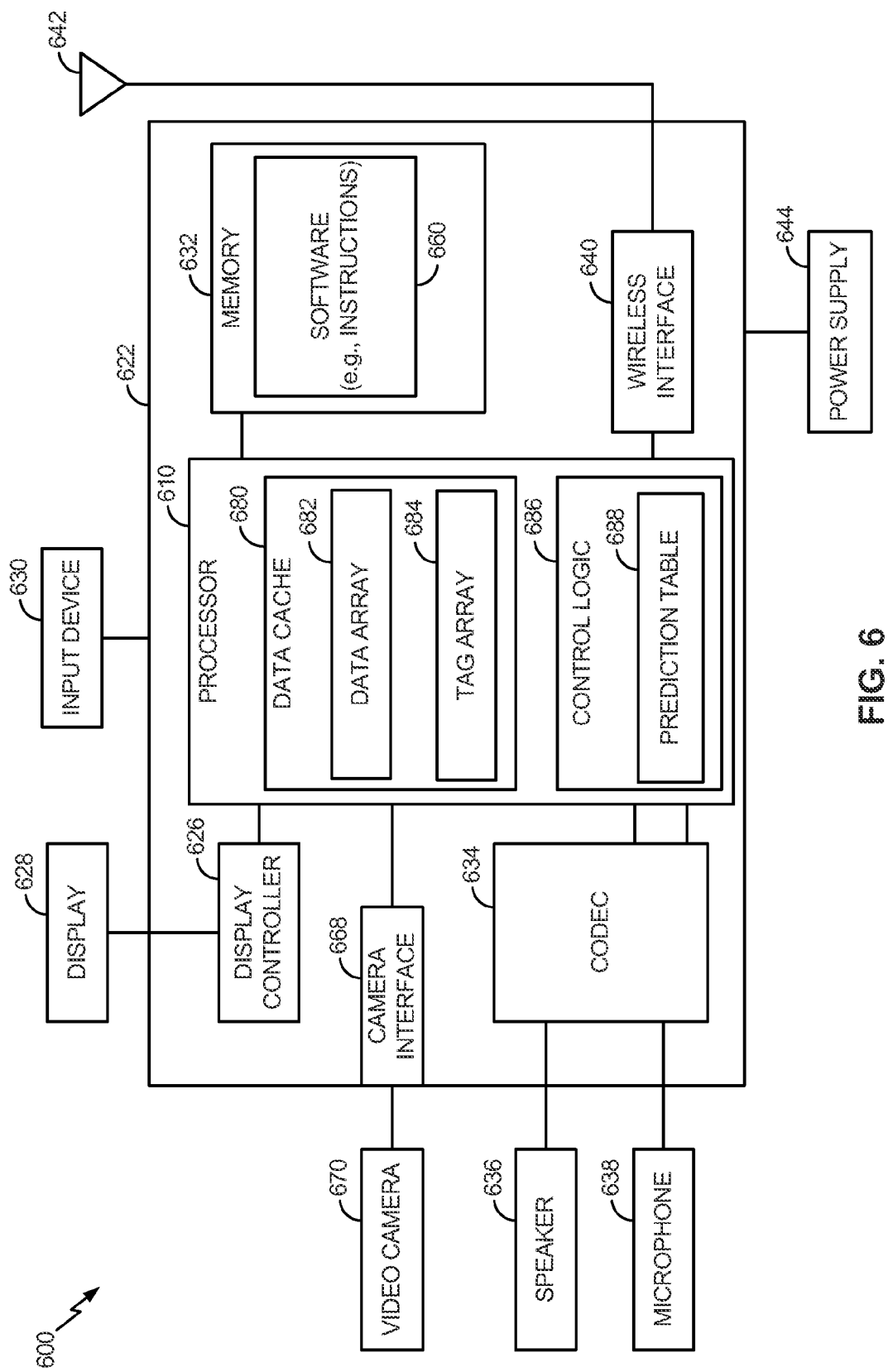
FIG. 6 is a block diagram of a particular embodiment of a wireless communication device including a data cache and logic to perform way prediction.

FIG. 6 is a block diagram of a particular embodiment of a device 600 (e.g., a communication device) including a cache memory system that utilizes a multi-bit way prediction mask. The device 600 may be a wireless electronic device and may include a processor 610, such as a digital signal processor (DSP), coupled to a memory 632.

The processor 610 may be configured to execute software 660 (e.g., a program of one or more instructions) stored in the memory 632. The processor 610 may include a data cache 680 and control logic 686. For example, the data cache 680 may include or correspond to the data cache 102 of FIG. 1, and the control logic 686 may include or correspond to the control logic 150 of FIG. 1. The data cache 680 may include a data array 682 and a tag array 684. The data array 682 and the tag array 684 may correspond to the data array 110 and the tag array 180 of FIG. 1, respectively. The data array 682 may include a plurality of line drivers, such as the line drivers 140a-d of FIG. 1. The control logic 686 may include a way prediction table 688. The way prediction table 688 may include or correspond to the way prediction table 152 of FIG. 1. In an illustrative example, the processor 610 includes or corresponds to the processor system 100 of FIG. 1, or components thereof, and operates in accordance with any of the embodiments of FIGS. 1-5, or any combination thereof.

In a particular embodiment, the processor 610 may be configured to execute computer executable instructions 660 stored at a non-transitory computer-readable medium, such as the memory 632, that are executable to cause a computer, such as the processor 610, to perform at least a portion of any of the method 200 of FIG. 2, the method 300 of FIG. 3, the method 500 of FIG. 5, or any combination thereof. For example, the computer executable instructions 660 may be executable to cause the processor 610 to identify one or more way prediction characteristics of an instruction. The computer executable instructions 660 are further executable to cause the processor 610 to selectively read, based on identification of the one or more way prediction characteristics, a table to identify an entry of the table associated with the instruction that identifies a way of a data cache. The computer executable instructions 660 are further executable to cause the processor 610 to make a prediction whether a next access of the data cache based on the instruction will access the way.

A camera interface 668 is coupled to the processor 610 and is also coupled to a camera, such as a video camera 670. A display controller 626 is coupled to the processor 610 and to a display device 628. A coder/decoder (CODEC) 634 can also be coupled to the processor 610. A speaker 636 and a microphone 638 can be coupled to the CODEC 634. A wireless interface 640 can be coupled to the processor 610 and to an antenna 642 such that wireless data received via the antenna 642 and the wireless interface 640 can be provided to the processor 610. In a particular embodiment, the processor 610, the display controller 626, the memory 632, the CODEC 634, the wireless interface 640, and the camera interface 668 are included in a system-in-package or system-on-chip device 622. In a particular embodiment, an input device 630 and a power supply 644 are coupled to the system-on-chip device 622. Moreover, in a particular embodiment, as illustrated in FIG. 6, the display device 628, the input device 630, the speaker 636, the microphone 638, the wireless antenna 642, the video camera 670, and the power supply 644 are external to the system-on-chip device 622. However, each of the display device 628, the input device 630, the speaker 636, the microphone 638, the wireless antenna 642, the video camera 670, and the power supply 644 can be coupled to a component of the system-on-chip device 622, such as an interface or a controller.

In conjunction with one or more of the described embodiments, an apparatus is disclosed that includes means for identifying one or more way prediction characteristics of an instruction. The means for identifying may include the control logic 150, the decode logic 190 of FIG. 1, the processor 610, the control logic 686 of FIG. 6, one or more other devices or circuits configured to identify one or more way prediction characteristics, or any combination thereof.

The apparatus may also include means for selectively reading, based on identification of the one or more way prediction characteristics, a table to identify an entry of the table associated with the instruction that identifies a way of a data cache. The means for selectively reading a table may include the control logic 150 of FIG. 1, the control logic 686 of FIG. 6, one or more other devices or circuits configured to selectively read the table, or any combination thereof.

The apparatus may also include means for making a prediction whether a next access of the data cache based on the instruction will access the way. The means for making the prediction may include the control logic 150 of FIG. 1, the control logic 686 of FIG. 6, one or more other devices or circuits configured to make the prediction, or any combination thereof.

The apparatus may also include means for decoding the instruction, where the instruction includes a register identifier and has a predictable next address. The means for decoding may include the decode logic 190 of FIG. 1, the processor 610 of FIG. 6, one or more other devices or circuits configured to decode the instruction to be executed, or any combination thereof.

The apparatus may also include means for selectively driving a data cache line based on the way. The means for selectively driving a data cache line may include the line drivers 140a-c of FIG. 1, the data array 682 of FIG. 6, one or more other devices or circuits configured to selectively drive the data cache line, or any combination thereof.

One or more of the disclosed embodiments may be implemented in a system or an apparatus, such as the device 600, that may include a mobile phone, a cellular phone, a satellite phone, a computer, a set top box, an entertainment unit, a navigation device, a communications device, a personal digital assistant (PDA), a fixed location data unit, a mobile location data unit, a tablet, a portable computer, a desktop computer, a monitor, a computer monitor, a television, a tuner, a radio, a satellite radio, a music player, a digital music player, a portable music player, a video player, a digital video player, a digital video disc (DVD) player, a portable digital video player, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof.

Although one or more of FIGS. 1-6 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated, circuitry including a processor and a memory.

Those of skill would further appreciate that the various illustrative logical blocks, configurations, modules, circuits, and algorithm steps described in connection with the embodiments disclosed, herein may be implemented as electronic hardware, computer software executed by a processor, or a combination thereof. Various illustrative components, blocks, configurations, modules, circuits, and steps have been described, above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An illustrative storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   if an instruction has a way prediction characteristic, during a first execution of the instruction:
      performing a first read of a table to identify an entry of the table that is associated with the instruction and that identifies a way associated with one or more cache lines of a data cache accessed during the first execution;
      performing an arithmetic operation to make a prediction whether a second access of the data cache will access the way, the second access corresponding to a second execution of the instruction, the second execution to be performed subsequent to the first execution; and
      in response to the prediction, determining whether to invalidate or delete the entry; and
   if the instruction does not have the way prediction characteristic, executing the instruction without performing the first read.

2. The method of claim 1, wherein the way prediction characteristic comprises an addressing mode of the instruction, an instruction type of the instruction, an indication whether the instruction is included in a loop, or a combination thereof.

3. The method of claim 2, further comprising, determining whether the addressing mode of the instruction is an auto increment addressing mode or a base plus offset addressing mode.

4. The method of claim 3, further comprising setting a predicted way field of the entry to identify a particular way of the data cache in response to a determination that the addressing mode of the instruction comprises the auto increment addressing mode, wherein the predicted way field is set upon generation of the entry.

5. The method of claim 2, further comprising determining whether the instruction type of the instruction is a load type or a store type.

6. The method of claim 2, wherein the table is selectively read in response to the indication that the instruction is included in a particular loop.

7. The method of claim 1, further comprising setting a predicted way field of a particular entry of the table to identify a particular way of the data cache in response to a determination that an addressing mode of a particular instruction comprises a base plus offset addressing mode, wherein the particular entry is generated in connection with a particular execution of the particular instruction, and wherein the predicted way field is set based on a subsequent execution of the particular instruction.

8. The method of claim 1, further comprising:
   determining whether the table includes the entry;
   determining whether the entry is valid to provide a way prediction; and
   in response to determining that the entry indicates a valid predicted way, retrieving the predicted way from the entry and selectively driving the predicted way of the data cache.

9. The method of claim 1, further comprising:
   identifying a particular instruction that modified data of a register location;
   determining whether a particular entry in the table includes a register identifier corresponding to the register location;
   determining whether the particular entry corresponds to the particular instruction; and
   removing or invalidating the particular entry when the particular entry does not correspond to the particular instruction.

10. A processor comprising:
    decode logic configured to decode an instruction; and
    control logic coupled to the decode logic, the control logic configured to:
       if the instruction has a way prediction characteristic, during a first execution of the instruction:
          perform a first read of a table to identify an entry of the table that is associated with the instruction and that identifies a way associated with one or more cache lines of a data cache accessed during the first execution;
          perform an arithmetic operation to make a prediction whether a second access of the data cache will access the way, the second access corresponding to a second execution of the instruction, the second execution to be performed subsequent to the first execution; and
          in response to the prediction, determine whether to invalidate or delete the entry; and
       if the instruction does not have the way prediction characteristic, execute the instruction without performing the first read.

11. The processor of claim 10, further comprising:
    a plurality of line drivers, wherein at least one line driver of the plurality of line drivers is selectively enabled or disabled during the second access based on the prediction;
    a tag array configured to perform a tag lookup operation based on the instruction;
    a multiplexer responsive to the plurality of line drivers and responsive to a way select signal received from the tag array or the control logic; and
    a switch configured to selectively enable or disable the tag lookup operation.

12. The processor of claim 11, wherein the instruction is associated with an increment value and an address, and wherein performance of the arithmetic operation to make the prediction includes:
    determining an incremented address of the instruction by adding the increment value to the address; and
    determining whether the incremented address is located in a same cache line of the data cache as the address.

13. The processor of claim 12, wherein the control logic is further configured to:
    selectively disable the tag lookup operation during the second access based on a determination that the incremented address is located in the same cache line; and
    provide a way select signal to the multiplexer when the tag lookup operation is disabled.

14. The processor of claim 12, wherein the control logic is further configured to remove the entry or indicate that the entry of the table is invalid based on a determination that the incremented address is associated with a different cache line than a cache line associated with the address.

15. An apparatus comprising:
means for decoding an instruction; and
means for selectively reading a table, the means for selectively reading coupled to the means for decoding and configured to:
if the instruction has a way prediction characteristic, during a first execution of the instruction:
perform a first read of the table to identify an entry of the table that is associated with the instruction and that identifies a way associated with one or more cache lines of a data cache accessed during the first execution;
perform an arithmetic operation to make a prediction whether a second access of the data cache will access the way, the second access corresponding to a second execution of the instruction, the second execution to be performed subsequent to the first execution; and
in response to the prediction, determine whether to invalidate or delete the entry; and
if the instruction does not have the way prediction characteristic, execute the instruction without performing the first read.

16. The apparatus of claim 15, further comprising means for selectively driving a data cache line based on the way.

17. The apparatus of claim 15, wherein a particular entry in the table indicates a predicted way based on a value of one or more bits, and wherein the one or more bits are applied as a mask to a plurality of drivers to selectively enable or disable each driver of the plurality of drivers.

18. A non-transitory computer readable medium comprising instructions that, when executed by a processor, cause the processor to:
if an instruction has a way prediction characteristic, during a first execution of the instruction:
perform a first read of a table to identify an entry of the table that is associated with the instruction and that identifies a way associated with one or more cache lines of a data cache accessed during the first execution;
perform an arithmetic operation to make a prediction whether a second access of the data cache will access the way, the second access corresponding to a second execution of the instruction, the second execution to be performed subsequent to the first execution; and
in response to the prediction, determine whether to invalidate or delete the entry; and
if the instruction does not have the way prediction characteristic, execute the instruction without performing the first read.

19. The non-transitory computer readable medium of claim 18, wherein performance of the arithmetic operation to make the prediction comprises:
identifying an increment value associated with the instruction;
adding the increment value to an address value associated with the instruction to determine an incremented address value; and
determining whether the incremented address value is associated with the way.

20. The non-transitory computer readable medium of claim 18, further comprising instructions that, when executed by the processor, cause the processor to populate the entry in the table, wherein each entry in the table includes a program counter identifier, a register identifier, and a predicted way identifier.

21. The non-transitory computer readable medium of claim 18, wherein the entry is generated after a determination is made that the instruction is included in a loop of one or more instructions.

22. The non-transitory computer readable medium of claim 18, further comprising instructions that, when executed by the processor, cause the processor to:
monitor a plurality of register locations;
determine whether data at a particular register location of the plurality of register locations is modified; and
read the table to determine whether a particular entry includes a register identifier corresponding to the particular register location.

23. A method comprising:
identifying an increment value during a first execution of an instruction;
identifying a way of a data cache accessed during the first execution based on the instruction;
adding the increment value to an address value associated with the instruction to determine a first incremented address value;
determining whether the first incremented address value is located in the way of the data cache; and
populating an entry corresponding to the instruction in a table conditioned on the instruction having a way prediction characteristic and in response to determining that the first incremented address is located in the way of the data cache.

24. The method of claim 23, wherein each entry in the table includes a program counter identifier, a register identifier, a predicted way identifier, a validity bit, or a combination thereof.

25. The method of claim 23, further comprising determining whether the instruction comprises an auto increment instruction or a base plus offset instruction.

26. The method of claim 23, wherein the entry identifies the way of the data cache accessed, wherein the entry is populated in connection with the first execution of the instruction, and further comprising:
if a particular instruction is the instruction having a particular way prediction characteristic, during a second execution of the instruction, performing a first read of the entry from the table, calculating a second incremented address value, retrieving the way from a way field of the entry, and selectively enabling a driver of the data cache corresponding to the retrieved way; and
if the particular instruction does not have the particular way prediction characteristic, executing the particular instruction without performing the first read.

27. The method of claim 23, further comprising updating the table in response to determining that an incremented address value of a subsequent execution of the instruction is located in a different way than the way, wherein the subsequent execution of the instruction is after the first execution.

28. The method of claim 23, further comprising removing the entry or indicating that the entry of the table is invalid based on a determination that the incremented address is associated with a different cache line than a cache line associated with the address.

29. The method of claim 23, further comprising:
identifying a particular instruction that modified data of a register location; reading the table to determine whether a particular entry includes a register identifier corresponding to the register location;

determining whether the particular entry corresponds to the particular instruction; and removing or invalidating the particular entry when the particular entry does not correspond to the particular instruction.

\* \* \* \* \*